Patented Apr. 17, 1951

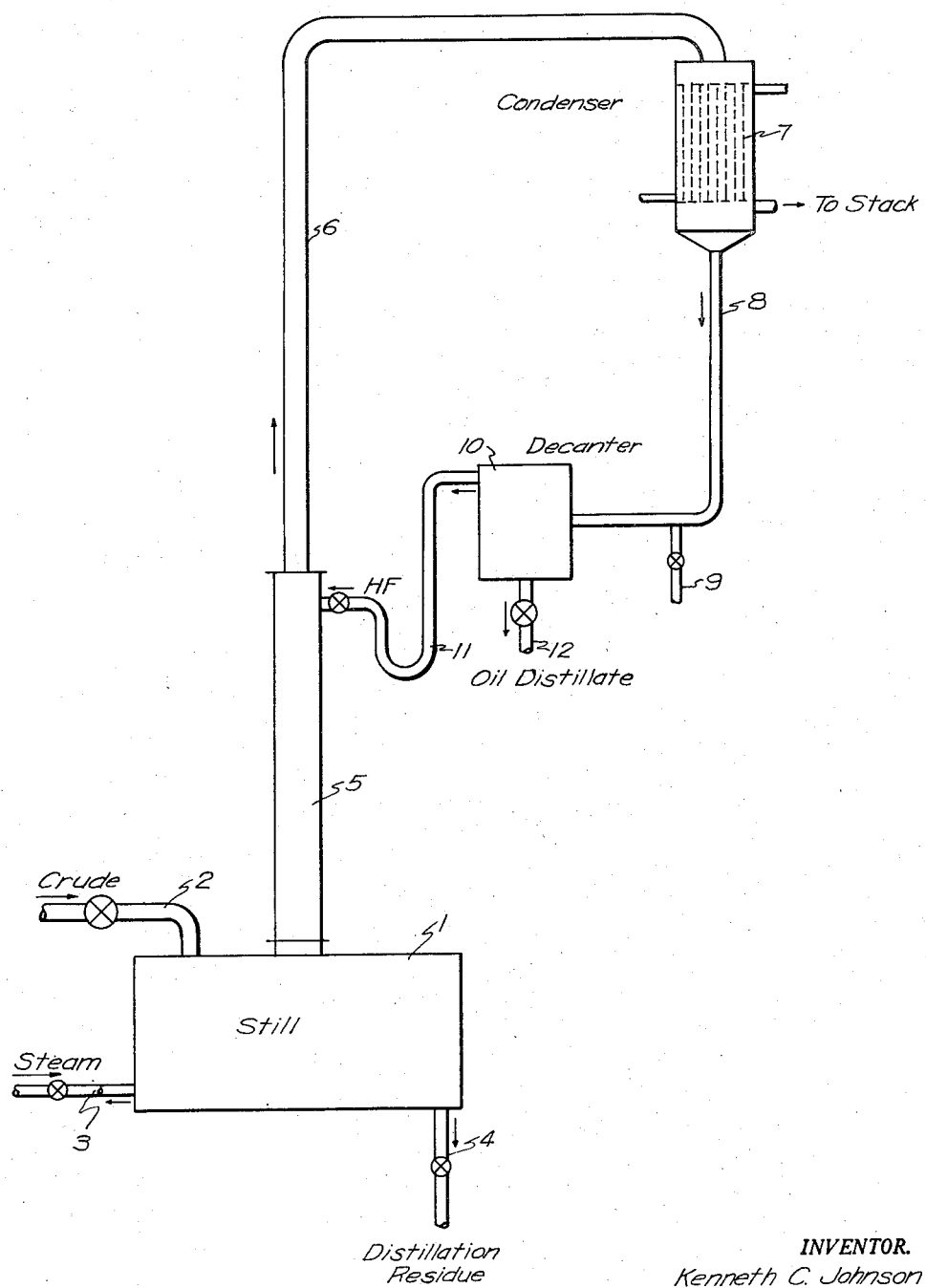

2,549,609

UNITED STATES PATENT OFFICE 2,549,609

SEPARATION OF FLUORINATED HYDROCARBONS BY DISTILLATION WITH HYDROGEN FLUORIDE

Kenneth C. Johnson, Claymont, Del., assignor to the United States of America as represented by the United States Atomic Energy Commission Application October 27, 1944, Serial No. 560,700

9 Claims. (Cl. 202—42)

This invention relates to the separation of fluorinated hydrocarbons and is especially concerned with the separation of fluorinated hydrocarbons having the same carbon skeleton but differing from one another in the relative numbers of hydrogen and fluorine atoms present in the molecule.

It is an object of the invention to provide an effective method for the separation of such compounds and especially to provide an improved distillation process whereby such compounds may be separated more completely and with less rectification than necessary for their separation by straight distillation.

In accordance with the process of the present invention, fluorinated hydrocarbons having the same carbon skeleton but differing from one another in the number of hydrogen atoms replaced by fluorine atoms are separated by distillation in the presence of hydrogen fluoride.

For separating fluorinated hydrocarbons in which at least half of the hydrogens of the hydrocarbon have been replaced by fluorine atoms, and which, in view of their high fluorine content, I shall designate "hydrofluorocarbons," distillation with hydrogen fluoride results in vaporization of fluorocarbon and those hydrofluorocarbons having a relatively high fluorine content at relatively low temperatures as compared with those hydrofluorocarbons having a relatively high hydrogen content.

The process of the invention is especially useful in separating mixtures obtained by the direct fluorination of hydrocarbons containing from 5 to 12 carbon atoms inclusive per molecule. Such mixtures normally contain several fluorination products; thus, if a hydrocarbon is fluorinated to an average fluorine content corresponding to the monohydrofluorocarbon derivatives, the product may contain the perfluoro compound, monohydrofluorocarbons, dihydrofluorocarbons, and hydrofluorocarbons of lower fluorine content (polyhydrofluorocarbons). It is often advantageous for economical operation to separate some of the less completely fluorinated hydrofluorocarbons and return them to the process for further fluorination.

Since direct fluorination of hydrocarbons, fluorohydrocarbons, and hydrofluorocarbons produces hydrogen fluoride as a by-product, use of the separation method of the present invention for treatment of fluorination product obtained by this process has the advantage that it employs a material which is readily available at the plant carrying out the fluorination process. Moreover, since such fluorination products are contaminated with hydrogen fluoride, the process of the present invention introduces no foreign substance that might tend to complicate the purification of the products.

The separation may be effected by fractional condensation of the hydrofluorocarbons of lower fluorine content, or by fractional vaporization of the fluorocarbon or hydrofluorocarbons of higher fluorine content. It will be understood that in the appended claims, the term "fractionation" is intended to include both of these separation methods whether or not rectification is employed.

The separation process of the invention may be carried out in a conventional type of still or in conventional fractionation equipment. Preferably a rectifying tower is employed.

The process may be effected in connection with the vapor phase fluorination of a volatile hydrocarbon and the vaporous fluorination products of such a process may be passed directly to a fractional condenser to effect the separation. The hydrofluorocarbons of relatively high hydrogen content condense first and those of relatively high fluorine content and the fluorocarbon condense later at lower temperatures. If insufficient hydrogen fluoride is present in the vapor stream as a result of the fluorination reaction, the hydrogen fluoride content may be adjusted by the introduction of additional hydrogen fluoride to provide an adequate quantity for promoting the separation.

Alternatively, the vaporous reaction products from the fluorination process may then be codistilled from the condensate with hydrogen fluoride. In some cases it is advantageous to apply the separation to only a part of the condensate. Thus the condensate of a fluorination process may comprise two phases, in which hydrogen fluoride and organic fluorination product replace one another as solvent and solute. The hydrofluorocarbons are more soluble than the fluorocarbon in hydrogen fluoride and accordingly a selective separation occurs with the hydrogen fluoride phase containing a lower ratio of fluorocarbon to hydrofluorocarbons than the organic phase contains. It may be desirable to separate the two phases and to subject only the phase in which hydrogen fluoride constitutes the solvent to the process of the invention.

When an amount of hydrogen fluoride sufficient to act as a distillation vehicle but not an excessive amount is present, the overhead condensate from the fractionation separates into two liquid phases, a fluorocarbon and/or hydrofluorocarbon phase containing dissolved hydrogen fluoride and a hydrogen fluoride phase containing dissolved fluorocarbon and/or hydrofluorocarbons. The latter phase, being the lighter, normally forms an upper layer and may be decanted off. A part or all the hydrogen fluoride decantate may be returned as reflux to the rectifying column.

The process of the invention may be applied to the fluorination product obtained by liquid phase fluorination processes in the same manner as described for treatment of condensate from vapor phase processes.

The accompanying drawing illustrates diagrammatically a distillation apparatus suitable for carrying out the process. The numeral 1 designates a pot still having an inlet pipe 2 for liquid to be distilled, a heating coil 3, and an outlet 4 for distillation residue. Mounted on top of the still 1 is a rectifying column 5, which may be packed with any suitable packing material such as steel rings. From the top of column 5 a vapor line 6 leads to condenser 7, which may be cooled by circulating brine or other cooling liquid. From the bottom of condenser 7 pipe 8, having a valve-controlled outlet pipe 9, leads to decanter 10. Decanter 10 is provided with a valve-controlled liquid return line 11 from the top of the decanter to the top of column 5 and with an oil draw-off pipe 12 for removing oil distillate. This draw-off pipe has a valve 13, which may be controlled manually or automatically to maintain a substantially constant liquid partition level in the decanter.

For the sake of simplicity, lagging, jacketing and other conventional features of apparatus design have been omitted from the drawing.

In general the following procedure may be used:

The mixture of compounds to be separated is charged to pot still 1. An adequate quantity of hydrogen fluoride is introduced to maintain an excess of hydrogen fluoride throughout the distillation of the hydrofluorocarbons to be distilled off. The quantity of hydrogen fluoride initially present need not be large since additional hydrogen fluoride may be added progressively or the same hydrogen fluoride may be used repeatedly by returning hydrogen fluoride decantate from decanter 10.

After the still is charged, it is heated to a distillation temperature. This temperature is below that at which hydrofluorocarbons of higher hydrogen content pass over with the overhead product. Either a part of the total condensate or a part or all of the hydrogen fluoride decantate is returned as coolant and reflux liquid to the top of the rectifying column 5. The distillation is conducted until the desired fluorinated hydrocarbons, i. e., fluorocarbon and/or hydrofluorocarbons of low hydrogen content are completely distilled out of the charge as indicated by a definite increase in temperature at the top of the rectifying column. Toward the end of the distillation the distillate usually contains too little organic material to form a separate phase. It is advantageous to change receivers at this point and withdraw this single liquid phase distillate separately through line 9. It may be returned to the still later with a subsequent charge. This avoids dilution of the condensate in decanter 10 and prevents contamination of the distillation residue with distillate products. The distillation may then be continued until the distillate is practically pure hydrogen fluoride. If an excess of hydrogen fluoride is present in the still, the receiver may be changed again and distillation continued until all of this compound has been distilled off. Practically none of the hydrofluorocarbons of high hydrogen content distill off with this product. The distillation residue in still 1 will then be hydrofluorocarbons of the high hydrogen content free from fluorocarbon and its hydro derivatives of low hydrogen content.

The process may be carried out in continuous distillation apparatus as well as in a batch-type still. In continuous treatment of hydrofluorocarbon mixtures, the mixture containing hydrogen fluoride may be introduced at an intermediate point into a distillation column from which hydrofluorocarbons of relatively high hydrogen content are withdrawn at the bottom and fluorocarbon and hydrofluorocarbons of relatively high fluorine content are withdrawn at the top. The rectification is controlled to provide an overhead temperature below the temperature at which the hydrofluorocarbons of high hydrogen content pass over with the overhead product. As in the process using a pot-still either hydrogen fluoride decantate or a mixture of the hydrogen fluoride and fluorocarbon and hydrofluorocarbon condensate may be returned as reflux to the top of the rectifying column. It will be appreciated, of course, that the greater the proportion of hydrogen fluoride in the mixture introduced into an intermediate point of the column, the smaller will be the proportion of hydrogen fluoride which must be returned as reflux at the top of the column.

The following example will further illustrate the process of the present invention:

Example

Vapors obtained by the vapor phase fluorination of normal heptane with cobalt trifluoride at 250° to 350° C. are condensed at minus 30° C., forming a condensate comprising a hydrogen fluoride phase and a perfluoroheptane phase. The perfluoroheptane phase is relatively pure perfluoroheptane from which the pure product may be obtained by fractional distillation. The hydrogen fluoride phase contains approximately 2% of fluorinated heptanes, including perfluoroheptane, mono- and di-hydroperfluoroheptanes and hydroperfluoroheptanes of a lower fluorine content. The term "polyhydroperfluoroheptanes" is used in the appended claims to designate the hydrofluoroheptanes containing from three to seven hydrogen atoms.

The hydrogen fluoride phase is separated from the perfluoroheptane phase by decantation and 298 parts by weight of the hydrogen fluoride liquid phase are placed in a pot-still supplied with a reflux column and a dephlegmator and distilled at three pounds gauge pressure. During the first part of this distillation, the condensate consists of two liquid phases, one a fluorinated hydrocarbon phase containing dissolved HF and the other a hydrogen fluoride phase containing dissolved fluorinated hydrocarbon. The first fraction distills over at a temperature of about 19° C., and consists of a mixture of hydrogen fluoride, perfluoroheptane, and monohydroperfluoroheptanes and possibly dihydroperfluoroheptanes. When all of these fluorinated hydrocarbons have passed over, the temperature of distillation rises to the boiling point of hydrogen fluoride at the distillation pressure and hydrogen fluoride continues to distill until no more comes over. The still residue consists of about 3.5 parts of polyhydroperfluoroheptanes, e. g., trihydro and tetrahydroperfluoroheptanes, and some hydrogen fluoride.

The fluoroheptanes in the fluorinated hydrocarbon layer of the distillate are separated from hydrogen fluoride dissolved therein by agitating with water and decanting the resulting separate aqueous phase. Three parts of fluoroheptane oil are thus obtained boiling at about 90° C. It is considered that this product comprises monohydroperfluoroheptanes (pentadecafluoroheptanes), two known isomers of which boil at 87.4° and 91.9° C., and smaller quantities of perfluoroheptane boiling at 82.5° C. and possibly a small proportion of dihydroperfluoroheptanes (tetradecafluoroheptanes), one isomer of which is known to boil at 95.7° C.

Additional examples of fluorocarbons which may be separated from less completely fluorinated compounds by the process of the invention are perfluoro-ethylcyclopentane, perfluoro-methylcyclohexane, and perfluoro-dimethylcyclohexane.

The prefix "perfluoro," as applied to a compound, indicates that fluorine is substituted for each of the hydrogen atoms ordinarily present in such compound, except as otherwise indicated by substituents specifically identified by further prefixes to the term "perfluoro" in the name of the compound.

It will be understood that I intend to include variations and modifications of the invention and that the preceding examples are illustrations only and in no wise to be construed as limitations upon the invention, the scope of which is defined in the appended claims, wherein I claim:

1. The method of separating a mixture of fluorinated hydrocarbons having the same carbon skeleton containing from five to twelve carbon atoms but differing from one another in the relative numbers of hydrogen and fluorine atoms in the molecule, which comprises subjecting the mixture to fractionation in admixture with sufficient hydrogen fluoride to provide an overhead product comprising a hydrogen fluoride liquid phase.

2. The method of separating a hydrofluorocarbon from a mixture thereof with a hydrofluorocarbon having the same carbon skeleton containing from five to twelve carbon atoms but having a higher hydrogen content, which comprises fractionally distilling the mixture in admixture with sufficient hydrogen fluoride to provide an overhead product comprising a hydrogen fluoride liquid phase.

3. The method of separating a fluorinated hydrocarbon containing from five to twelve carbon atoms and not more than 2 hydrogen atoms from a mixture containing a polyhydrofluorocarbon boiling from the mixture in the same temperature range, which comprises fractionally distilling the mixture in admixture with sufficient hydrogen fluoride to proxide an overhead product comprising a hydrogen fluoride liquid phase.

4. The method of separating a fluorinated hydrocarbon containing from five to twelve carbon atoms and less than three hydrogen atoms per molecule from a mixture thereof with a polyhydrofluorocarbon having the same carbon skeleton, which comprises subjecting the mixture to distillation and rectification in admixture with sufficient hydrogen fluoride to provide an overhead product comprising a hydrogen fluoride liquid phase, and maintaining an overhead temperature below the temperature at which the polyhydrofluorocarbon passes over with the overhead product.

5. The method of separating a fluorinated aliphatic hydrocarbon containing from five to twelve carbon atoms and less that three hydrogen atoms per molecule from a mixture thereof with at least one polyhydrofluorocarbon having the same carbon skeleton, which comprises subjecting the mixture to distillation and rectification in admixture with a proportion of hydrogen fluoride regulated to provide an overhead product comprising a fluorinated hydrocarbon liquid phase and a hydrogen fluoride liquid phase, and maintaining an overhead temperature below the temperature at which the polyhydrofluorocarbon passes over with the overhead product.

6. The method of separating a fluoroheptane containing not less than 14 fluorine atoms from a mixture thereof with a polyhydroperfluoroheptane which comprises subjecting the mixture to distillation and rectification in admixture with sufficient hydrogen fluoride to provide an overhead product comprising a hydrogen fluoride liquid phase, and maintaining an overhead temperature below the temperature at which the polyhydroperfluoroheptane passes over with the overhead product.

7. The method of separating perfluoroheptane and pentadecafluoroheptane from a mixture thereof with at least one polyhydroperfluoroheptane, which comprises subjecting the mixture to distillation and rectification in admixture with a proportion of hydrogen fluoride regulated to provide an overhead product comprising a fluoroheptane liquid phase and a hydrogen fluoride liquid phase, and maintaining an overhead temperature below the temperature at which the polyhydroperfluoroheptane passes over with the overhead product.

8. The method of separating a fluorinated hydrocarbon containing from five to twelve carbon atoms and not more than two hydrogen atoms from a mixture containing a polyhydrofluorocarbon boiling from the mixture in the same temperature range, which comprises fractionally distilling the mixture in admixture with sufficient hydrogen fluoride to provide an overhead product consisting of two liquid phases.

9. The method of separating a fluorinated hydrocarbon containing from five to twelve carbon atoms and not more than two hydrogen atoms from a mixture containing a polyhydrofluorocarbon boiling from the mixture in the same temperature range, which comprises subjecting the mixture to fractional azeotropic distillation, employing hydrogen fluoride as the azeotropic agent while retaining the polyhydrofluorocarbon as distillation residue.

KENNETH C. JOHNSON.

REFERENCES CITED

The following references are of record in the file of this patent:

UNITED STATES PATENTS

| Number | Name | Date |
| --- | --- | --- |
| 2,013,050 | Henne | Sept. 3, 1935 |
| 2,220,713 | Grosse | Nov. 5, 1940 |